Feb. 13, 1923.

C. A. JOHNSON.
DISHWASHING MACHINE.
FILED JUNE 1, 1920.

1,445,320.

2 SHEETS—SHEET 1.

INVENTOR.
Clyde A. Johnson

Feb. 13, 1923.
C. A. JOHNSON.
DISHWASHING MACHINE.
FILED JUNE 1, 1920.
1,445,320.
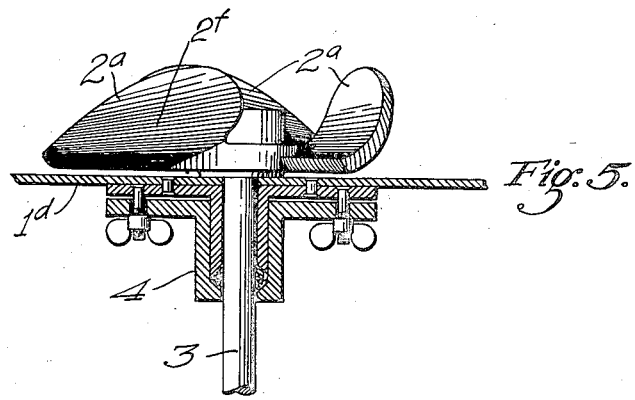
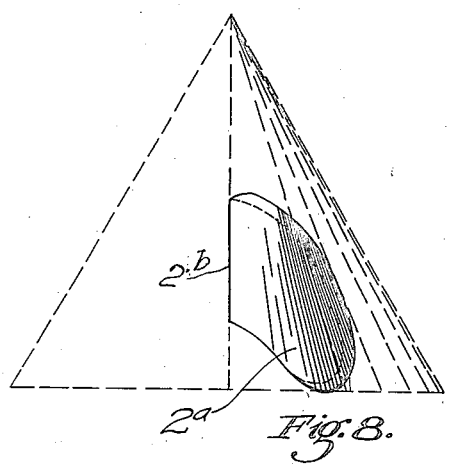
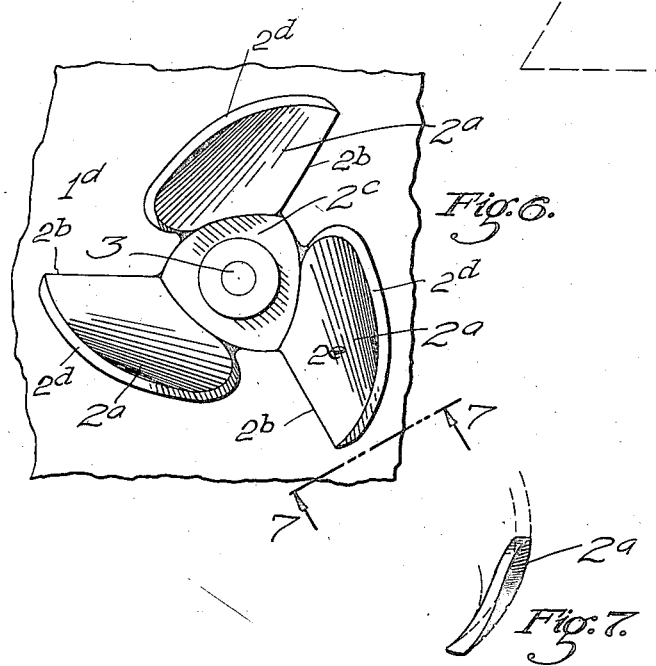
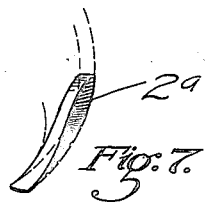
INVENTOR.
Clyde A Johnson Patented Feb. 13, 1923.

1,445,320

UNITED STATES PATENT OFFICE.

CLYDE A. JOHNSON, OF SAN DIEGO, CALIFORNIA.

DISHWASHING MACHINE.

Application filed June 1, 1920. Serial No. 385,807.

*To all whom it may concern:*

Be it known that I, CLYDE A. JOHNSON, a citizen of the United States, residing at San Diego, in the county of San Diego and State of California, have invented certain new and useful Improvements in Dishwashing Machines, of which the following is a specification.

My invention relates to dish washing machines in which the dishes are positioned on racks and trays that are readily removable, which racks and trays are positioned in a receptacle and cleaned by forcing water against them, and the objects of my invention are: first, to provide a water throwing member mounted in the bottom of a receptacle and rapidly revolved whereby a current of water is thrown upwardly and outwardly in the form of an inverted frusto-cone so that dishes placed in the path of the current of water will be rapidly and thoroughly cleansed by the force of the water thrown against them; second, to provide a dish washer of this class with a novelly constructed throwing member, and third, to provide a dish washer water throwing member of this class which is very simple and economical of construction, durable, very efficient in its action and which will not readily deteriorate or get out of order.

Figure 1:
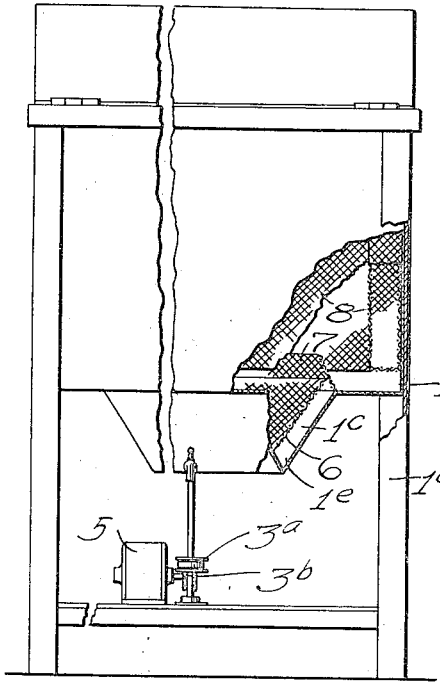
Figure 2:
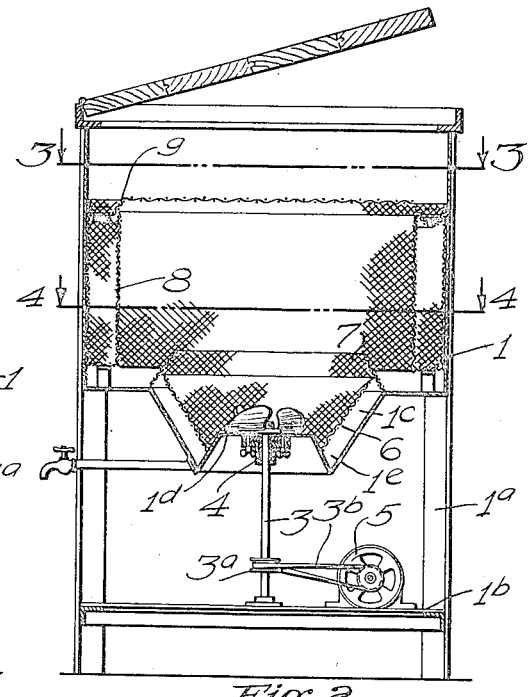
Figure 3:
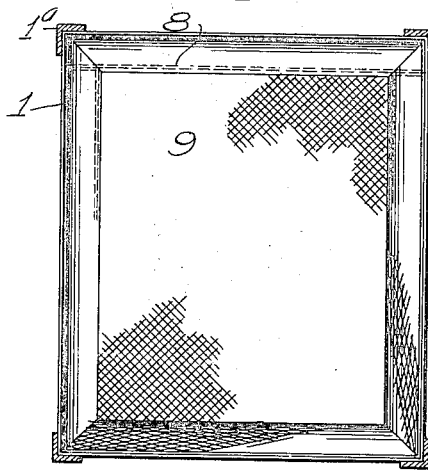
Figure 4:
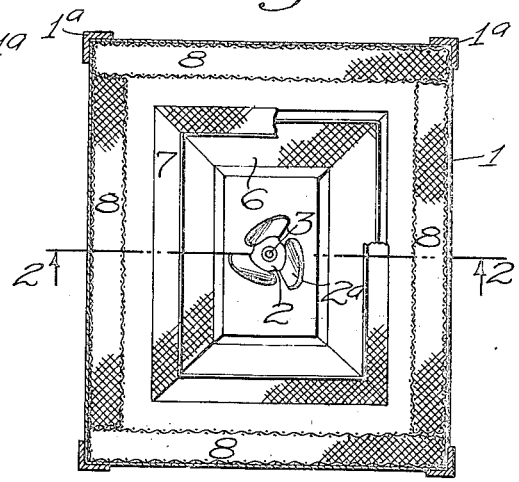

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of my dish washer showing fragmentary portions broken away and in section to facilitate the illustration and showing the cover partially raised; Fig. 2 is a sectional view thereof through 2—2 of Fig. 4; Fig. 3 is a sectional view through 3—3 of Fig. 2; Fig. 4 is a sectional view through 4—4 of Fig. 2; Fig. 5 is an enlarged side elevational view of the water throwing member shown positioned on its support and stuffing box shown in section; Fig. 6 is a top or plan view of said water throwing member with a fragmentary portion of its supporting plate; Fig. 7 is a side elevational view of one of the blades of the water throwing member from the line 7—7 of Fig. 6 and Fig. 8 is a side elevational view of a cone shown dotted, the outer surface of which conforms with the outer surface of one of said blades shown solid.

Similar characters of reference refer to similar parts and portions throughout the several views of the drawings.

The receptacle 1, water throwing member 2, shaft 3, stuffing box 4, motor 5, screen 6, rack 7, rack 8 and tray 9 constitute the principal parts and portions of my dish washer.

The receptacle 1 is preferably a water tight receptacle positioned on legs $1^a$ and provided with a platform $1^b$. The bottom of the receptacle is provided with a central downwardly extending recess $1^c$ which is provided with a frusto-cone shaped bottom $1^d$ leaving an annular recess $1^e$. Mounted centrally on this frusto-cone shaped bottom portion $1^d$ is the water throwing member 2 by means of a shaft 3 and surrounding said shaft is a stuffing box 4 which is constructed of two plates positioned relatively to each other by means of bolts with wing nuts so that the stuffing box may be readily tightened as desired.

This water throwing member is shaped as shown best in Figs. 5 to 8 inclusive of the drawings, consisting of three curved, spaced apart blades $2^a$ positioned an equal distance apart in propeller form, each of the blades $2^a$ is provided with similar outer and inner curved surfaces both of which conform to the outer surface of the lower portion of a cone and is made by cutting patterns for the same from the outer surface of the cone, the front side $2^b$ of said blade $2^a$ being aligned with a line from the base to the apex as shown best in Fig. 8 of the drawings and the inner surface of the blade shaped conforming to its outer surface thus providing a water throwing member consisting of a main central portion $2^c$, with the blades $2^a$ extending integrally therefrom, the front side $2^b$ of each being straight and extending in straight line from the portion $2^c$ and gradually curving backwardly, upwardly and outwardly from said straight side, toward and to the upper outer edge 2$^d$ being concave on the upper inner side 2$^e$ and convex on the lower outer side 2$^f$ with an outline of inverted frusto-cone shape when revolving rapidly whereby an inverted frusto-cone shaped stream of water is thrown upwardly and outwardly from said water throwing member.

The lower end of said shaft 3 is provided with a sheave 3$^a$ near its lower end over which is mounted a belt 3$^b$ which is preferably twisted and mounted over a sheave on the axle of the motor 5 thus providing the motive power for the water throwing device. Mounted around this water throwing device and with its lower end extending into the annular recess 1$^e$ is an inverted cone shaped screen 6 spaced from the lower side of the wall of the recess 1$^c$ which is adapted to prevent crumbs and other matter from the dishes from being drawn in and thrown onto the dishes by the water throwing member 2. Mounted immediately over this upper edge of the screen 6 is an inverted rack 7 which is adapted to support a skillet or other cooking utensil or dish that needs special attention, with its inner side down which is adapted to receive the water in full force from the water throwing device and there is also provided racks 8 for plates along the sides and a tray 9 for dishes, knives, forks and spoons, etc., however, these racks and trays are readily removable and may be changed and positioned and portions removed as desired to get the best results with different and varying arrangement of the dishes.

Though I have shown and described a particular construction, combination and arrangement of parts and portions I do not wish to be limited to this particular construction, combination and arrangement of parts and portions but desire to include in the purview of my invention the construction, combination and arrangement substantially as set forth in the appended claims.

The operation of my dish washer is as follows: The receptacle 1 is provided with a small quantity of hot water together with a suitable cleaning compound or soap, it being here noted that only a small quantity of water is used and sufficiently heated so that the dishes will quickly dry while remaining in the receptacle after the machine is stopped. It is preferred to run the water throwing member at a rapid rate of speed. In washing cooking utensils, china ware, knives, forks and spoons and the like they are positioned in a suitable location in the receptacle and are subjected to the force of the water from the water throwing member, the crumbs and other particles going down around the outside into the recess 1$^e$ and the screen 6 prevents them from being drawn into the water throwing member. As soon as the washing is complete the machine is stopped and the dishes immediately dry by reason of the heated water.

Having thus described my invention what I claim as new and desire to secure by Letters Patent is:

1. In a dish washing machine, a water throwing member having a central portion and blades connected to said central portion, each blade having a horizontal forward edge extending radially of said central main portion and an upwardly turned rear curved side.

2. In a dish washing machine, a water throwing member having a central portion and blades connected to said central portion, each blade having a horizontal forward edge extending radially of said central main portion and an upwardly turned rear curved side, and a flat, solid, raised supporting member upon which said water throwing member is revolubly mounted.

3. In a dish washing machine, a water throwing member having a central portion and blades connected to said central portion, each blade having a horizontal forward edge extending radially of said central main portion and an upwardly turned rear curved side, the curvature of said blades conforming substantially with the outer surface of a cone near the base of said cone when said blade is positioned with the straight front side line portion in alinement with a straight line from the base to the apex of said cone and the back portion of said blade extending downwardly to the base of said cone.

4. In a dish washing machine, a water throwing member having a central portion and blades connected to said central portion, each blade having a horizontal forward edge extending radially of said central main portion and an upwardly turned rear curved side, the curvature of said blades conforming substantially with the outer surface of a cone near the base of said cone when said blade is positioned with the straight front side line portion in alinement with a straight line from the base to the apex of said cone and the back portion of said blade extending downwardly to the base of said cone and a flat, raised, solid base member upon which said water throwing member is revolubly mounted.

5. In a dish washing machine, a water throwing member having a central portion and blades connected to said central portion, each blade having a horizontal forward edge extending radially of said central main portion and an upwardly turned rear curved side, the curvature of said blades conforming substantially with the outer surface of a cone near the base of said cone when said blade is positioned with the straight front side line portion in alinement with a straight line from the base to the apex of said cone and the back portion of said blade extending downwardly to the base of said cone, a flat, raised, solid base member upon which said water throwing member is revolubly mounted and an annular recess extending around said flat raised portion adapted to receive dirt, crumbs, and other substances from the dishes.

In testimony whereof, I have hereunto set my hand at San Diego, California, this 24th day of May, 1920.

CLYDE A. JOHNSON.